Aug. 7, 1934.   F. JOHANNSEN ET AL   1,968,946
FURNACE FOR THE PRODUCTION OF METAL SPONGE
Filed Dec. 14, 1931
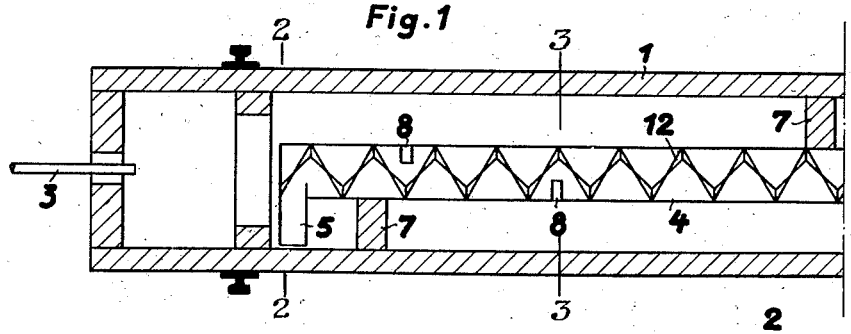
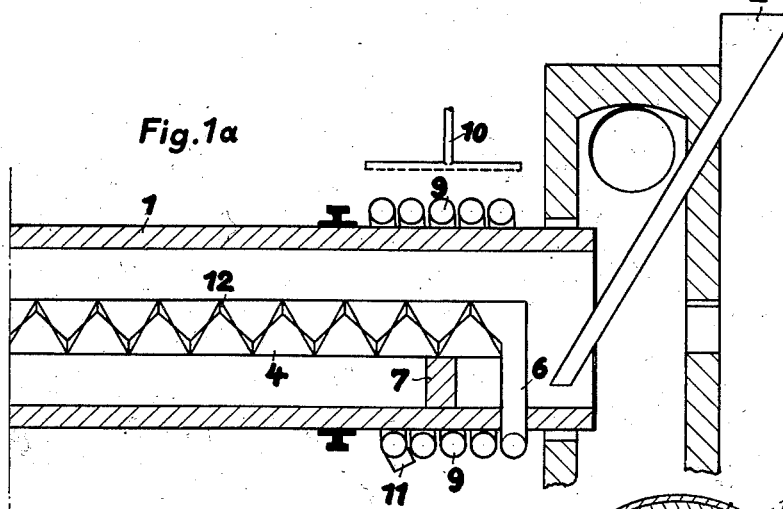
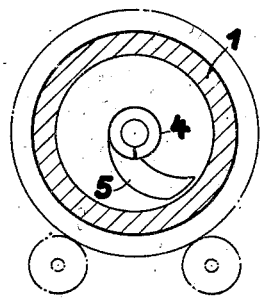
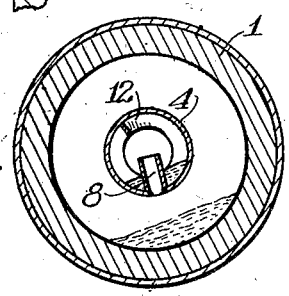
Inventors:
ARTHUR LEYSNER
FRIEDRICH JOHANNSEN Patented Aug. 7, 1934

1,968,946

UNITED STATES PATENT OFFICE 1,968,946

FURNACE FOR THE PRODUCTION OF METAL SPONGE

Friedrich Johannsen and Arthur Leysner, Magdeburg, Germany, assignors to firm Fried. Krupp Grusonwerk Aktiengesellschaft, Magdeburg-Buckau, Germany Application December 14, 1931, Serial No. 580,989
In Germany December 18, 1930

11 Claims. (Cl. 263—32)

The present invention relates to a process and apparatus for the production of metal sponge, in particular iron sponge, by means of a continuous rotary furnace. It is a known process to reduce to sponge materials containing iron, for example concentrates, in continuous rotary furnaces, by adding, in the reduction process, solid reducing substances, for example fuel, and burning the reduction gases e. g. CO, produced in the furnace above the charge in the oxidizing furnace atmosphere. These known processes may be so carried out that the heat produced in the combustion of the reduction gases together with the heat from the direct superficial combustion of the fuel in the charge suffices to cover the total heat requirements of the process, so that supplementary heating by a flame is necessary only to a small extent or only periodically. The difficulties of the process, which nevertheless have made its introduction into working on a large scale hitherto impossible, are caused by the fact that, in the last part of the furnace in the vicinity of the discharge end thereof, a re-oxidation of the iron sponge sets in on the surface of the charge, and that also the residue discharged from the furnace has still so high a temperature that the iron in it is subsequently partly again oxidized by the entry of air.

According to the present invention, the carrying out of the above process, which is very advantageous from the point of view of utilization of heat, is facilitated by the provision, in the rotating part of the furnace itself, of cooling spaces into which the charge reduced in the furnace is introduced so that the charge, before leaving the cooling spaces, has been brought to a temperature making re-oxidation impossible. The process may be effected in practice, for example, by the material at the discharge end of the actual furnace space being caused to fall into an annular space which is situated around the jacket of the rotary furnace and which, for better cooling, may be sprayed from the outside. The discharge of the cooled charge from this cooling space is preferably effected under such conditions that the gas is cut off, the charge itself being able to effect the cutting off, for example, by making the cooling space in the form of a tubular helix disposed around the furnace, so that the material in each turn effects a single or multiple sealing at any position of the furnace. The whole cooling space may be made as a helical pipe, whereby greater cooling and an improved gas seal are attained. On the entry of the hot charge into the first part of the cooling space, at first a further reduction will take place and the reduction gases thereby formed, since they cannot escape on account of the design of the cooler, will pass back into the furnace and at the same time prevent inlet of the oxidizing furnace gases into the cooling space.

In many cases, it is advisable to construct the first part of the cooling space as a muffle, so that completion of the reducing process takes place therein with exclusion of the oxidizing furnace gases, the muffle being indirectly heated by the latter and the combustion of the reducing gases formed in the furnace. This muffle is suitably constructed of one or more lengths of tube which are arranged on the axis of rotation of the rotary furnace, or parallel thereto, and in which the material is carried in a contrary direction to that of its travel in the furnace. The result is hereby attained that the part of the muffle in which the supplementary reduction takes place is situated in the principal zone of reaction of the outer furnace, while the second part of the muffle where a preliminary cooling is to take place is situated in the pre-heating zone, so that the heat present in the reduced charge is utilized for the preliminary heating of the raw material charge in the furnace and consequently gives up heat to the muffle. To carry back the material in the lengths of tubing or furnace section, conveyors, e. g. worm conveyors, may be built therein. From the muffle, the second part of which may if desired also serve for the preliminary cooling, the material passes into the above-described cooling space. The reducing gases still formed in large quantities in the muffle contribute by their reducing action to the completion of the formation of the iron sponge and, since they cannot escape through the cooling space, or only to a small extent, pass out into the furnace space and burn there in the oxidizing furnace atmosphere. It may also be advisable in particular cases to introduce externally produced reducing gases for the completion of the reduction in the muffle, the surplus of these gases also passing out into the furnace. If it is not desired for these reducing gases to pass out at one point, as for example at the inlet opening for the material alone, several gas outlets may be provided on the muffle inside the furnace, so that the combustion takes place at various points and with better utilization of the heat contained in the muffle gases.

A furnace suitable for carrying out the process is shown diagrammatically in the drawing as an example.

Figures 1, 1a show a longitudinal section through the furnace and

Figure 2 a cross-section on the line 2—2 of Figure 1.

Figure 3 is a cross-section on the line 3—3 of Figure 1.

1 indicates the rotary furnace which may be horizontal or slightly inclined. At 2 the mixture of the material to be reduced with the reducing agent is inserted through an inlet tube or other suitable feeding-in device. The burner 3 serves for the periodical or continuous heating of the furnace space. At this point, furthermore, the air necessary for the combustion of the reducing gases enters. 4 indicates a muffle which consists of a suitable iron alloy or a heat-resisting material, as for example silicon carbide, graphite, or the like. The charge, already reduced to a large extent in the furnace, enters the muffle by means of a shovel 5, or the like and is conveyed to the outlet 6, for example by a worm 12 fixed to the muffle wall so as to rotate therewith. The muffle is supported in any desired manner within the furnace, for example by masonry pillars 7 arranged radially. The material is further reduced in the first part of the muffle by means of indirect heating under reducing atmospheric conditions. The reducing gases thereby produced pass out at 5 and also through outlets 8. The discharge end of the muffle is situated in the preheating zone of the furnace, so that there, conversely, heat is given from the muffle to the furnace and thereby a preliminary cooling of the material in the muffle is effected. 9 is the cooling space for which, as an example, a closed helical tube is shown. This is cooled by water by means of a spraying device 10. The cooled charge leaves at 11.

The process is suitable for all metals which, under corresponding furnace conditions, permit the production of a metallic sponge, in particular for the production of iron sponge. Solid or liquid fuels come primarily into question as the reducing media, but other reducing agents, such as carbides, may be used in the same way.

Having now particularly described and ascertained the nature of our said invention and in what manner the same is to be performed, we declare that what we claim is:—

1. A furnace for the production of metal sponge from ore, comprising a rotary furnace, means for feeding into one end of said furnace ore and reducing material, means for maintaining an oxidizing atmosphere above the charge in said furnace, a cooling chamber comprising a coiled conduit mounted on said furnace so as to rotate therewith, and means for feeding the reduced material from said furnace into said conduit, said last mentioned means being adapted to convey reducing gases issuing from the material in said cooling chamber into said rotary furnace, the coils of said cooling chamber being arranged so that the material, as it is advanced through the coil, is held in pockets which impede the exit of gases to the atmosphere.

2. A furnace as described in claim 1, in which said cooling chamber is in the form of a helical tube surrounding said rotary furnace and communicating with the interior of said furnace at one end, while its opposite end is provided with a discharge opening for the reduced material.

3. A furnace for the production of metal sponge comprising in combination, a rotary tubular furnace, means for feeding ore and reducing material into said furnace, means for maintaining an oxidizing atmosphere in said furnace in the space above the charge, whereby the reducing material and reducing gases issuing from the charge are burned in the furnace, a muffle within said furnace, means for conveying the partially reduced material from said furnace into said muffle, means for conveying the material through said muffle, and a cooling chamber connected with the delivery end of said muffle, said cooling chamber being constructed so as to maintain a neutral or reducing atmosphere therein and being adapted to cool the material below the temperature at which it would reoxidize.

4. A furnace as described in claim 3, in which said cooling chamber is in the form of a coiled tube surrounding the furnace and adapted to rotate therewith.

5. A furnace as described in claim 3, wherein said muffle is arranged in said furnace so as to have a ring-shaped intermediate space between the muffle and the walls of the furnace for the material to travel through.

6. A furnace as described in claim 3, wherein said muffle is in the form of a tube coaxially mounted within said furnace so as to rotate therewith.

7. A furnace as described in claim 3, wherein said muffle is in the form of a tube coaxially mounted within said furnace so as to rotate therewith, said tube having a conveying worm therein fixed thereto so as to rotate with the tube.

8. A furnace as described in claim 3, wherein the means for conveying the partially reduced material from said furnace into said muffle is in the form of a shovel directed toward the entrance to the muffle and adapted to rotate with the furnace.

9. A furnace as described in claim 3, wherein said muffle is located partly in the reducing zone of said furnace and partly in the zone of the furnace wherein the ore is preheated, whereby said muffle is heated by combustion of the reducing gases issuing from the charge in the furnace and a heat exchange takes place between the hot reduced material in said muffle and the ore passing through the preheating zone of said furnace.

10. A furnace as described in claim 3, wherein said cooling chamber is adapted to prevent the exhaust of reducing gases developed in said muffle, whereby said gases are forced back into said furnace.

11. A furnace as described in claim 3, wherein said cooling chamber is adapted to prevent the exhaust of reducing gases developed in said muffle, whereby said gases are forced back into said furnace, said muffle being provided with a plurality of gas outlets to distribute the reducing gases in the furnace.

ARTHUR LEYSNER.
FRIEDRICH JOHANNSEN.